(12) United States Patent
Perry

(10) Patent No.: US 8,281,968 B2
(45) Date of Patent: Oct. 9, 2012

(54) LIGHTWEIGHT CARGO CARRIER FOR VEHICLES

(76) Inventor: John Wesley Perry, Upper Arlington, OH (US)

( * ) Notice: Subject to any disclaimer, the term of this patent is extended or adjusted under 35 U.S.C. 154(b) by 522 days.

(21) Appl. No.: 12/459,149

(22) Filed: Jun. 26, 2009

(65) Prior Publication Data

US 2010/0206929 A1  Aug. 19, 2010

Related U.S. Application Data

(60) Provisional application No. 61/133,293, filed on Jun. 26, 2008.

(51) Int. Cl.
 *B60R 9/06* (2006.01)
(52) U.S. Cl. .................................. 224/518; 224/524
(58) Field of Classification Search .............. 224/519, 224/521, 42.23, 518, 538, 524
See application file for complete search history.

(56) References Cited

U.S. PATENT DOCUMENTS

| | | | |
|---|---|---|---|
| 3,528,578 A * | 9/1970 | Schoenberger | 414/462 |
| 4,072,257 A | 2/1978 | Hall | |
| 4,403,716 A | 9/1983 | Carlson et al. | |
| 4,676,413 A | 6/1987 | Began et al. | |
| 5,033,662 A | 7/1991 | Godin | |
| 5,224,636 A | 7/1993 | Bounds | |
| 5,460,304 A | 10/1995 | Porter et al. | |
| 6,502,730 B2 | 1/2003 | Johnson | |
| 6,659,318 B2 * | 12/2003 | Newbill | 224/503 |
| 2006/0261111 A1 * | 11/2006 | McCoy et al. | 224/499 |

* cited by examiner

*Primary Examiner* — Nathan J Newhouse
*Assistant Examiner* — Adam Waggenspack
(74) *Attorney, Agent, or Firm* — The Law Office of Patrick F. O'Reilly III, LLC

(57) ABSTRACT

A lightweight cargo carrying structure mounted upon arms which cantilever rearward from tow eyes mounted at the rear of a vehicle. This invention provides an efficient way to expand the cargo-carrying capacity of a vehicle.

15 Claims, 6 Drawing Sheets

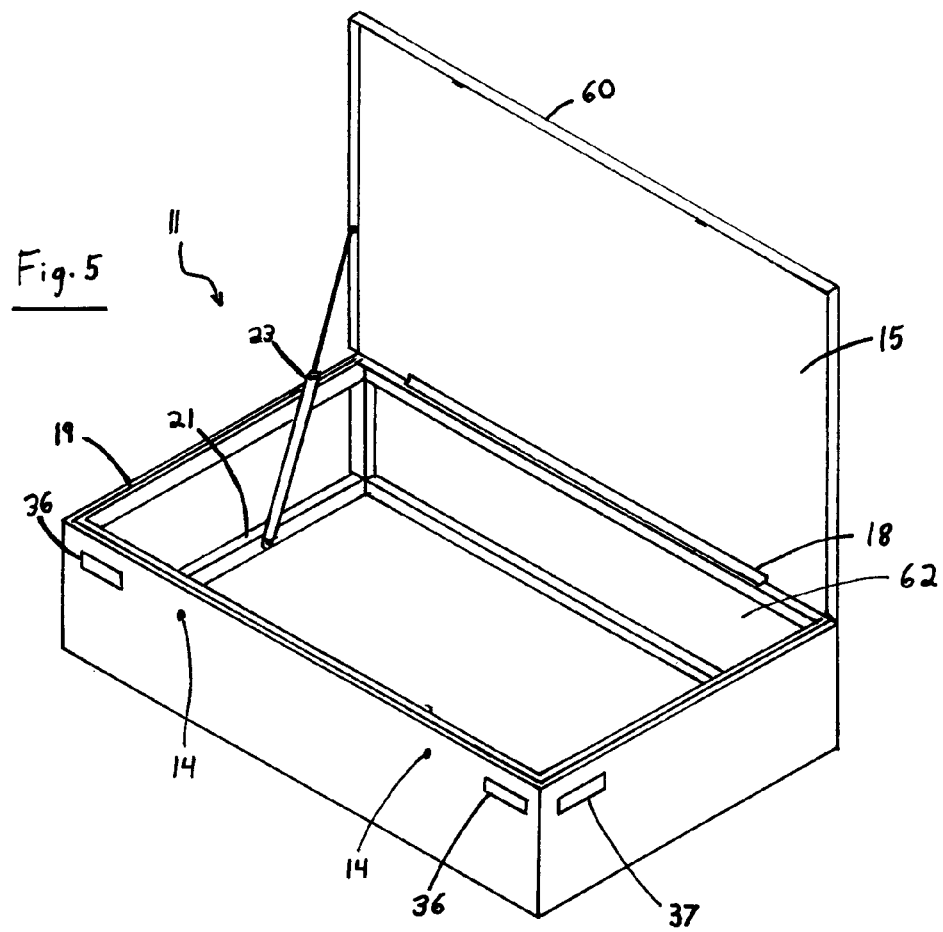
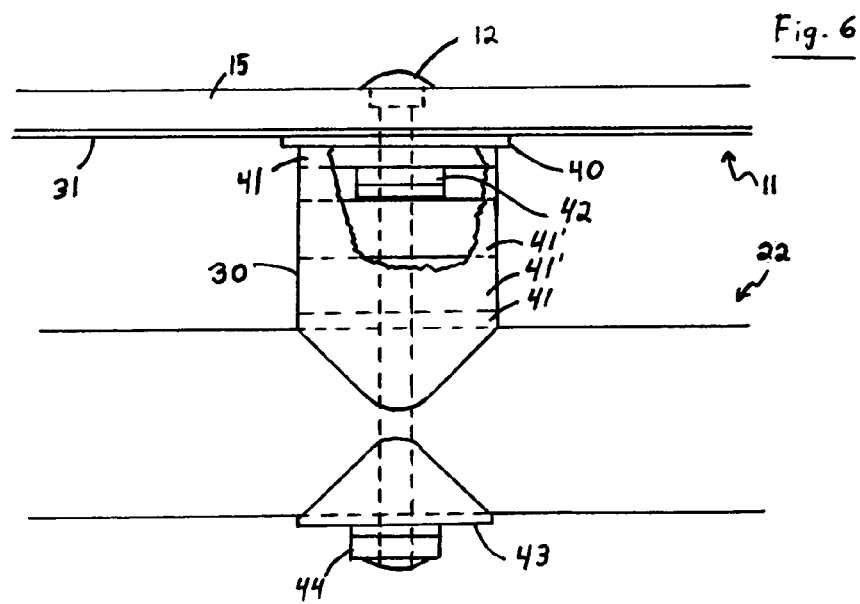

LIGHTWEIGHT CARGO CARRIER FOR VEHICLES

CROSS-REFERENCE TO RELATED APPLICATIONS

This application claims benefit of Provisional Patent Application No. 61/133,293 which was filed by the present inventor on Jun. 26, 2008.

FEDERALLY SPONSORED RESEARCH

None

SEQUENCE LISTING

None

BACKGROUND OF THE INVENTION

This invention relates generally to cargo carriers and more specifically to carriers which are mounted at the rear of a vehicle such as a car or truck. The carrier is supported by arms which engage tow eyes at the rear of the vehicle. These arms cantilever rearward to support a cargo enclosure, platform, rack or other cargo carrier.

The prior art provides many options for transporting objects when storage space within a vehicle is not adequate or appropriate. Roof top carriers, trailers, cargo carriers attached to hitches, and carriers attached to either vehicle bumpers or vehicle channel members are all well known. Each of these have limitations which are overcome by embodiments shown below of the present invention.

Roof top carriers significantly reduce the aerodynamic efficiency of the vehicle. Trailers are generally heavy; a significant number of vehicles' warranties are voided if the driver tows a trailer. Cargo carriers attached to hitches may require the purchase and installation of a hitch and are subject to large moments about the hitch which necessitate a heavy structure which increases carrier cost and detracts from vehicle mileage and carrier payload. Carriers attached to vehicle bumpers (Carlson et al., U.S. Pat. No. 4,403,716) require structure no longer found on most vehicles. Some carriers (Godin, U.S. Pat. No. 5,033,662) require conveniently-located vehicle channel members for their attachment, members not available in most vehicles, and also require formation of an aperture in these channel members.

Given these limitations, there is a need for a more efficient carrier which is lightweight, which saves fuel, which is easy to attach, and which is inexpensive to manufacture.

BRIEF DESCRIPTION OF THE DRAWINGS

There are presently shown in the drawings embodiments of the invention which are presently preferred, it being understood, however, that the invention is not limited to the precise arrangements and instrumentalities shown, wherein:

FIG. 5 is an isometric view of an embodiment of a cargo support means being an enclosure;

FIG. 6 is a cutaway side view of a means by which a cargo enclosure may be supported on carrier arms;

Figure 1:
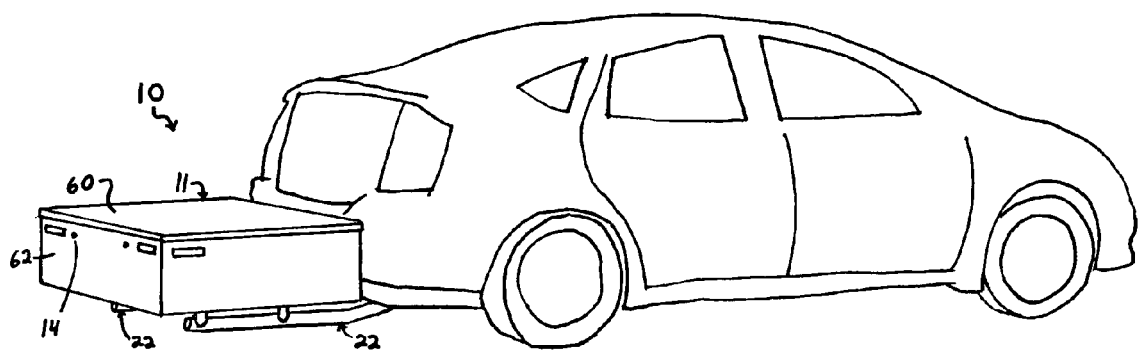
FIG. 1 is a perspective view of a cargo carrier of the present invention.

The below list summarizes the reference numbers and associated elements shown in the above drawings:

10 cargo carrier
11 cargo enclosure
12 carriage bolt
13 pin and clip assembly
14 drawer lock
15 rigid panel
18 hinge
19 gasket
20 flush fit handle
21 wood corner brace
22 cantilever arm assembly
22' cantilever arm assembly
23 lift support
26 outboard cantilever arm
26' outboard cantilever arm
27 bearing plate
27' bearing plate
28 primary bolt
29 high strength bearing bolt
30 leg
31 bottom exterior sheathing
32 flexible bumper
33 sacrificial adapter
34 spacer
35 tow eye
36 red reflector
37 amber reflector
39 cantilever arm primary hole
40 fender washer
41 bushing
41' lightweight bushing
42 bushing retaining nut
43 concave washer
44 stop nut
45 adjustment screw
46 adjustment nut
47 weld
47' weld
48 locking nut
49 bearing plate retainer
50 tow eye hole
51 fender washer
52 mandrel half
53 mandrel bolt
54 mandrel nut
55 primary nut 56 cargo platform assembly
57 cargo rack assembly
58 turnbuckle assembly
59 washer
60 top wall
61 bottom wall
62 encircling side wall
63 inboard cantilever arm
63' inboard cantilever arm
64 pin and locking end assembly
65 strike plate
66 leg assembly

DETAILED DESCRIPTION OF THE INVENTION

A first embodiment of a lightweight cargo carrier for vehicles 10 is shown in a perspective view in FIG. 1. The lightweight cargo carrier for vehicles 10 is shown with a cargo support means consisting of cargo enclosure 11 having a top wall 60, an encircling side wall 62, and a bottom wall 61 which is not shown in this view. A plurality of cantilever arms 22 is shown supporting cargo enclosure 11. The vehicle end of the cantilever arms 22 is not visible in this view.

Figure 2:
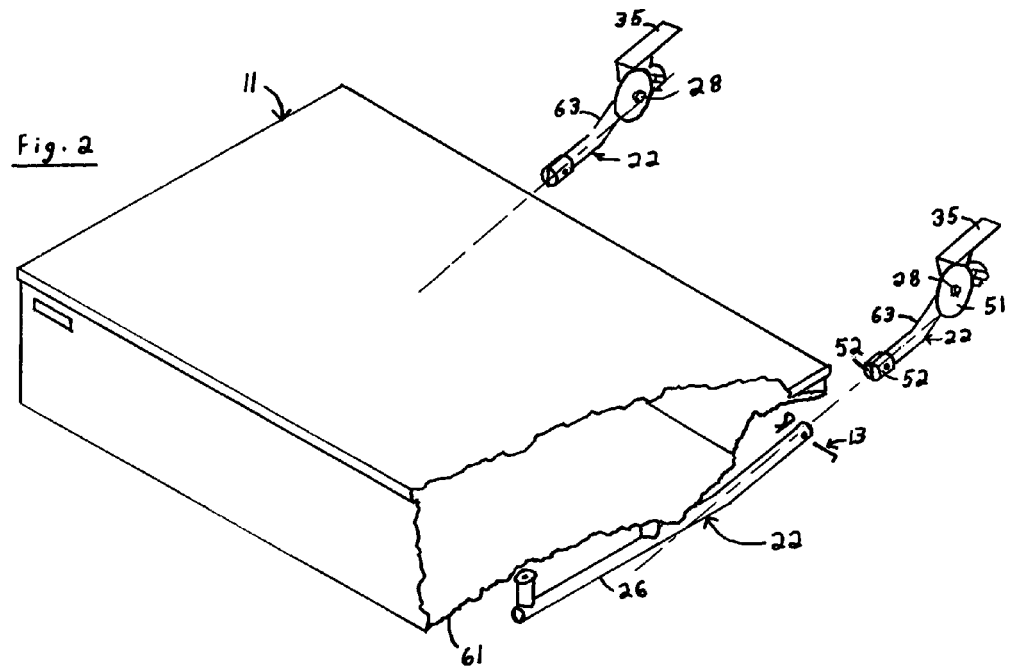
FIG. 2 is an isometric exploded view of a cargo carrier of the present invention wherein portions of the carrier have been removed to reveal an arrangement of the carrier arm structure.

The primary attachment means are shown as primary bolts 28 in FIG. 2 which view includes an exploded view of cantilever arm assembly 22. In this embodiment, inboard cantilever arm 63 telescopically engages outboard cantilever arm 26 and these two members are secured by a securing means consisting of a pin and clip assembly 13. Mandrel halves 52 acting in concert with inboard cantilever arm 63 define a generally cylindrical form with which to engage the end of outboard cantilever arm 26.

Bottom wall 61, visible in FIG. 2, is supported by two cantilever arm assemblies 22. Top wall 60, bottom wall 61 and encircling side wall 62 may be constructed of any strong, durable, sturdy, material. In one embodiment, these components are constructed of plywood, wood, aluminum sheet metal, and steel sheet metal. A durable plastic material, a composite material, or a lightweight metal such as aluminum or titanium could also be used to construct these components.

Figure 11:
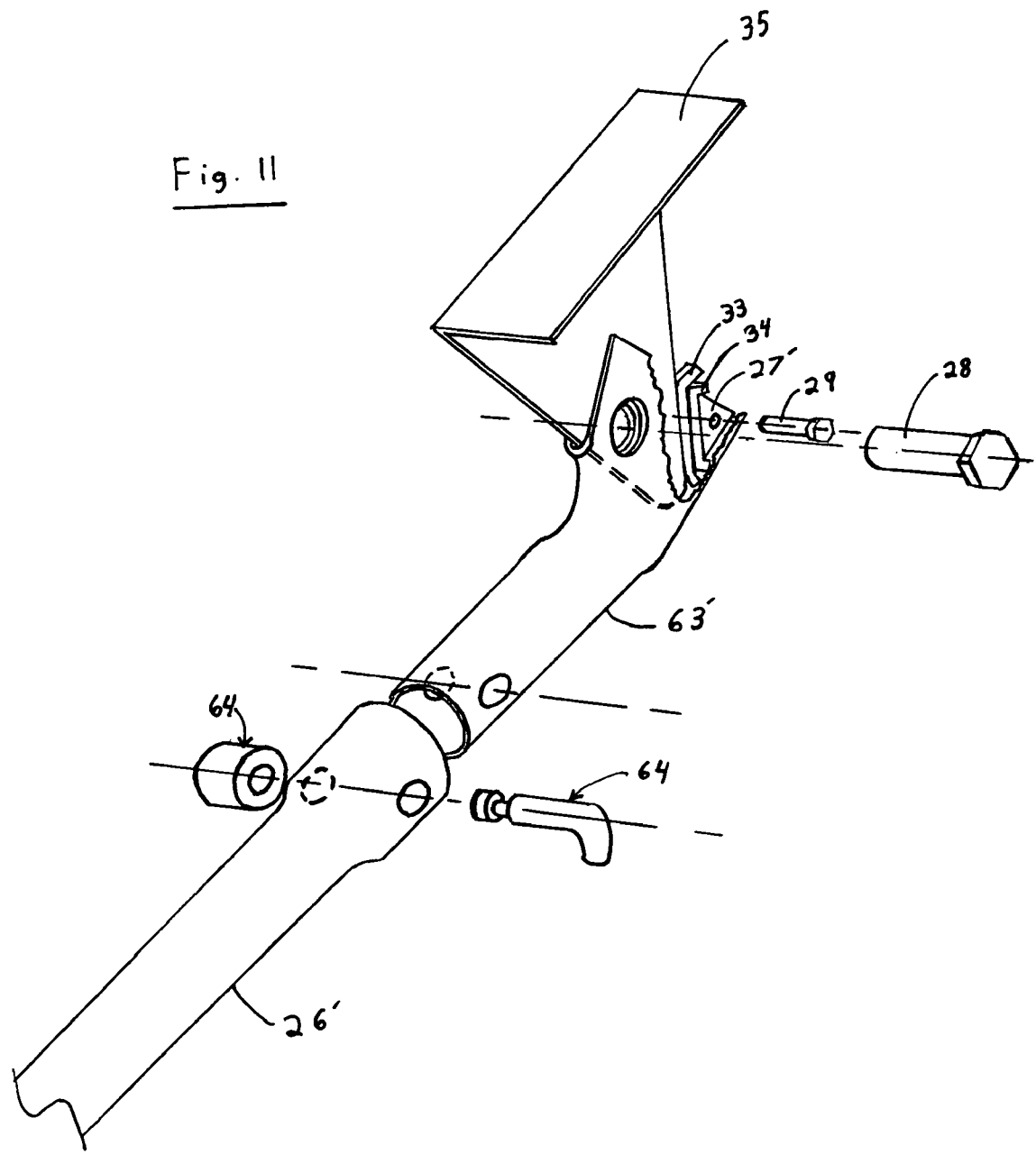
FIG. 11 is a perspective view of a disposition of one embodiment of a carrier arm of the present invention relative to a tow eye with some elements omitted for clarity.

In the embodiment shown in FIG. 2, inboard cantilever arms are made of steel plate and the outboard cantilever arms are constructed of tubular steel. Other embodiments could be made of other strong and durable materials including without limitation titanium or a composite material. Other embodiments could be made entirely of tubular steel appropriately bent and flattened as shown in FIG. 11.

Figure 3:
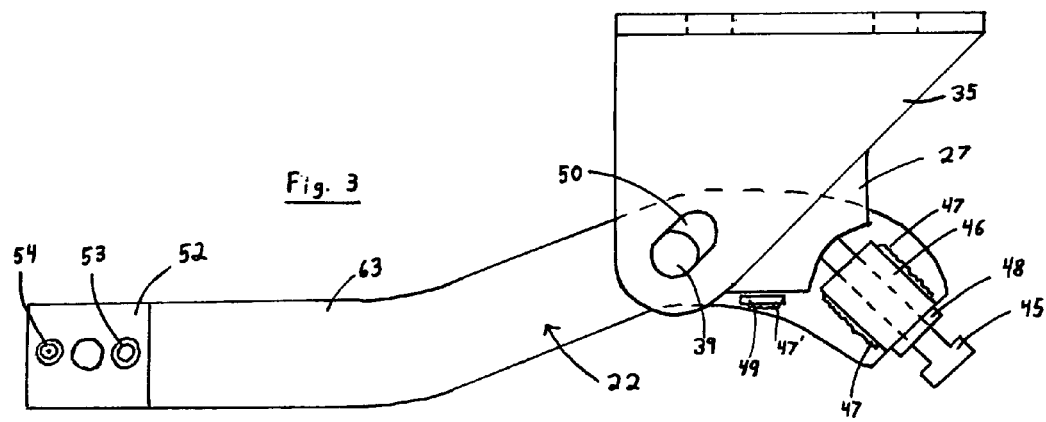
FIG. 3 is a side view of a disposition of one embodiment of a carrier arm of the present invention relative to a tow eye with some elements omitted for clarity.
Figure 4:
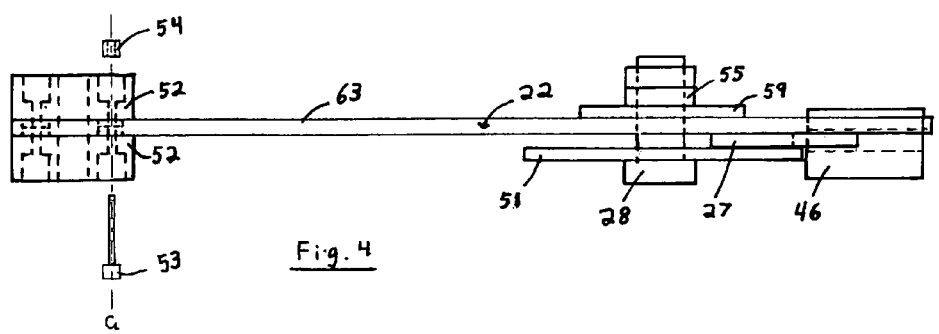
FIG. 4 is a top view of a disposition of one embodiment of a carrier arm of the present invention relative to a tow eye with the tow eye and some elements of the carrier arm omitted for clarity.

Adjustment means permitting modification of the angle of pitch of cantilever arms with respect to vehicle are demonstrated by adjustment screw 45, adjustment nut 46, bearing plate 27, and locking nut 48 in the embodiment shown in FIG. 3. The bearing plate 27 engages tow eye 35 at a point forward of the cantilever arm primary hole 39. The forward end of inboard cantilever arm 63 is machined to accept adjustment nut 46 so as to align the axis of adjustment nut 46 to be substantially aligned with the center plane of inboard cantilever arm 63. This embodiment shows adjustment nut 46 and inboard cantilever arm 63 fastened securely by weld 47. Bearing plate 27 is retained between inboard cantilever arm 63 and fender washer 51 by bearing plate retainer 49 which is secured to inboard cantilever arm 63 by weld 47'. This adjustment means is shortened or lengthened by the turning of adjustment screw 45. The present embodiment constructs adjustment screw 45, adjustment nut 46, bearing plate 27, and locking nut 48 of steel but these may be constructed of other similarly strong and durable materials. Mandrel halves 52, shown in FIG. 3, each possess a pair of annular projections which engage holes in the corresponding face of inboard cantilever arm 63. Mandrel bolt 53 and mandrel nut 54 work to retain mandrel halves 52 in proper alignment with inboard cantilever arm 63. In these embodiments, mandrel halves 52 are constructed of steel but could be constructed of any suitable material including iron, titanium or a composite material.

The cargo enclosure shown in FIG. 5 has a hollow interior. Also in FIG. 5, top wall 60 is connected to encircling side wall 62 by hinge 18 which is shown as a piano-style hinge though other embodiments could use other types of hinges such as multiple separate hinges or hinges constructed of a flexible material such as neoprene or heavy fabric. In one embodiment of the present invention lift support 23 retains top wall 60 in a substantially vertical position. In one embodiment of the present invention adjoining walls of a cargo enclosure are connected by a wood corner brace 21 to which both adjoining wall panels are glued and fastened with screws.

In one embodiment drawer locks 14 secure access to the cargo enclosure 11. In this embodiment the locks employed are lock sets marketed as drawer locks though they could be constructed with any suitable lock including many locks marketed as trailer door locks.

A leg 30 supporting a cargo enclosure 11 and supported in turn by cantilever arm assembly 22 is shown in FIG. 6. A plurality of bushings 41 keep carriage bolt 12 coaxial with leg 30. Bushing retaining nut 42 serves to hold the top bushing in place while stop nut 44 holds the cargo carrier 11 and the leg 30 to cantilever arm assembly 22. All of the components of the leg assembly 66 except lightweight bushings 41' are of steel in the embodiment shown, though they could be made of any suitably tough and durable material. Leg 30 and concave washer 43 are formed of tubular steel by means of cutting with a hole saw. Lightweight bushings 41' are of plywood in this embodiment but could be of any material suitably light and rigid such as a plastic material.

In the embodiment shown in FIG. 6 a rigid panel 15 comprises a bottom wall 61 being constructed of plywood. Bottom wall 61 is protected from damage by bottom exterior sheathing 31 which in this embodiment is sheet steel, though it could be of other similarly tough and durable materials such as sheet aluminum or sheet stainless steel.

Figure 7:
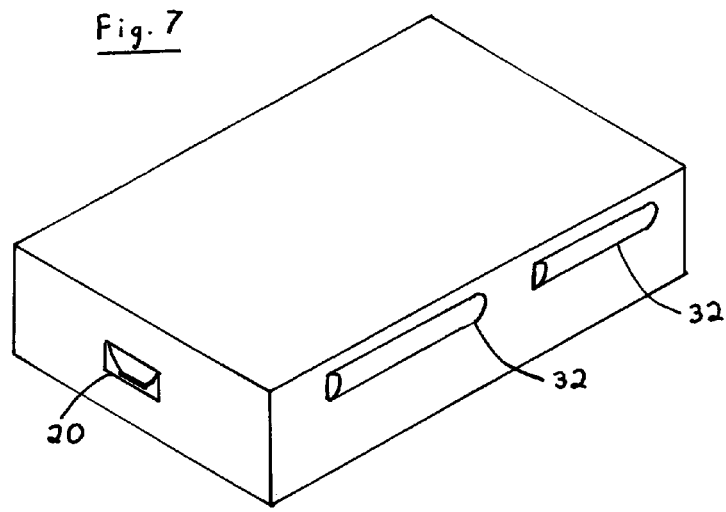
FIG. 7 is a perspective view of a cargo enclosure.

FIG. 7 shows flush fit handles 20 in one embodiment of the present invention. These are constructed of steel but could be of any suitably rigid and durable material such as aluminum. Also shown in FIG. 7 are flexible bumpers 32. These are composed of sheet vinyl in the present embodiment but could be constructed of any suitably flexible and durable material such as rubber.

Figure 8:
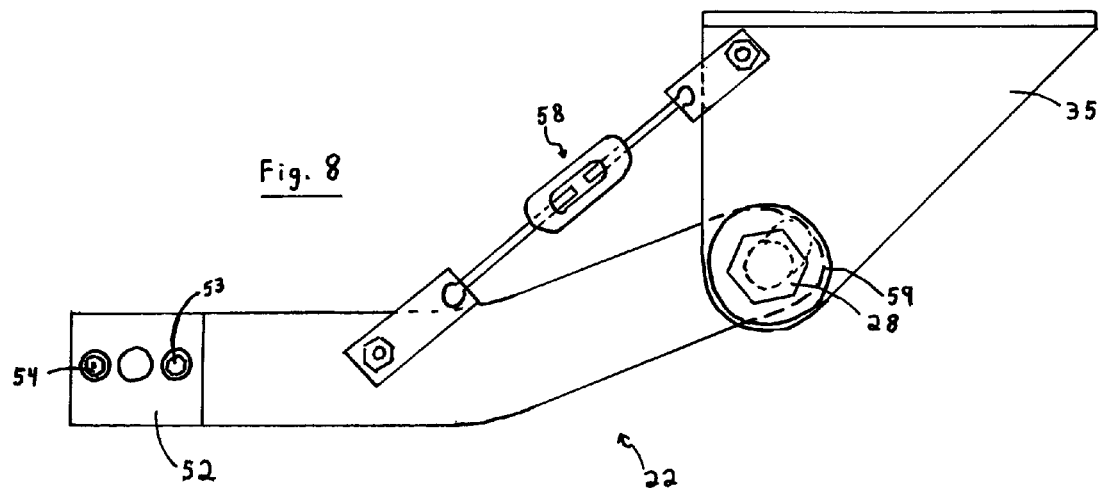
FIG. 8 is a side view of a disposition of one embodiment of a carrier arm of the present invention relative to a tow eye with some elements of the carrier arm omitted for clarity.

FIG. 8 shows a structural element in tension as a means to adjustably connect the cargo carrier to the vehicle in order to allow modification of the angle of pitch of the cantilever arm with respect to the vehicle. In this embodiment the structural element, turnbuckle assembly 58, engages the carrier at a point aft of the primary attachment means which is the primary bolt 28. In addition, the structural element, turnbuckle assembly 58, engages the vehicle at a point above the primary attachment means. In this embodiment the tension element is constructed of a turnbuckle of high strength steel though a turnbuckle could be constructed of any suitably strong and durable material. Other embodiments could attach to other elements of the vehicle structure for example vehicle channels, spare tire support structure, or bumper support structure. Other embodiments could be constructed of another type of structural element in tension, for instance a rope and pulley assembly, a cable and winch assembly or webbing with a ratchet.

Figure 9:
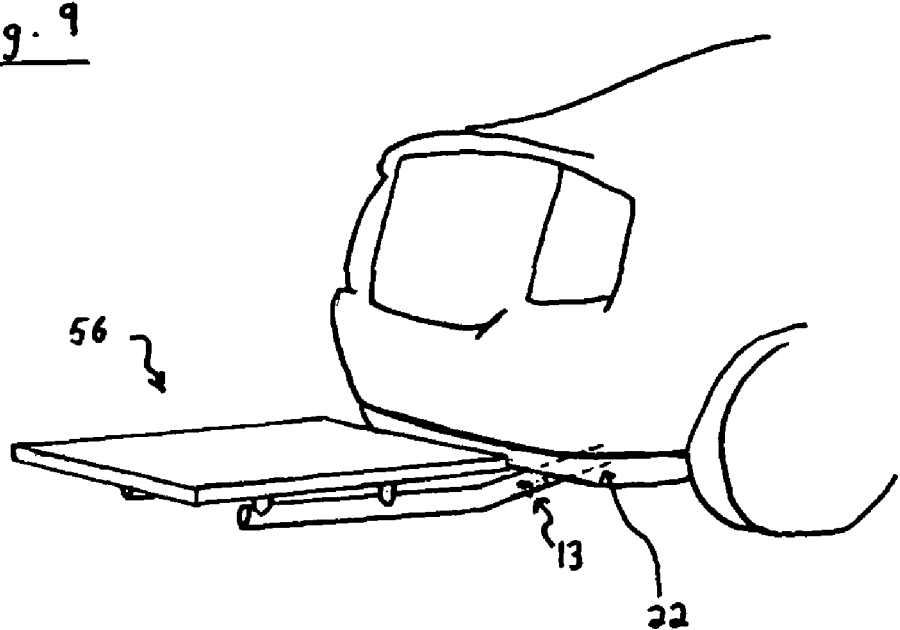
FIG. 9 is a perspective view of an embodiment of a cargo support means being a platform.

A cargo carrier of the present invention wherein the cargo support means is a platform assembly 56 is shown in FIG. 9. In the embodiment shown the platform surface is constructed of heavy duty welded wire hardware cloth, but other embodiments could be constructed of any other similarly strong and durable materials. For example, the platform surface could be constructed of diamond plate metal sheet.

Figure 10:
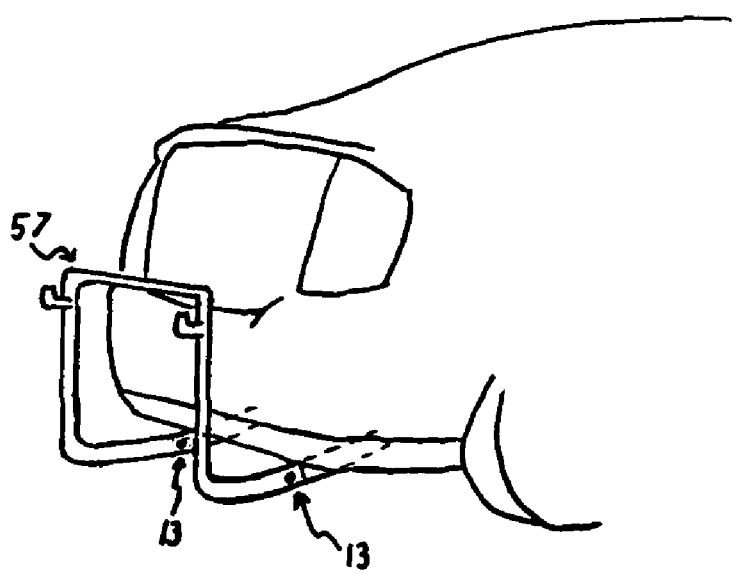
FIG. 10 is a perspective view of an embodiment of a cargo support means being a cargo rack.

FIG. 10 shows a cargo carrier of the present invention wherein the cargo support means is a rack assembly 57. In the embodiment shown the rack is disposed to carry bicycles. Other embodiments could be constructed to carry other large objects. For example, a rack could be built to carry skis. The embodiment shown is constructed of tubular steel which has been bent, cut, and welded. Other embodiments could be constructed of any suitably light and durable material such as aluminum, titanium or a composite material.

FIG. 11 shows an embodiment of the present invention in which an inboard cantilever arm 63' is constructed entirely of tubular steel. In this embodiment the tube is bent and the forward end of the tube is flattened over a form the same thickness as tow eye 35 and is then cut and drilled to receive tow eye 35, primary bolt 28, and high strength bearing bolt 29. In this embodiment bearing plate 27' is triangular and has a hole drilled in it through which passes high strength bearing bolt 29. Bearing plate 27' is the same thickness as tow eye 35 and is held substantially within inboard cantilever arm 63'. Sacrificial adapter 33 is composed of a relatively softer steel than tow eye 35 and is conformed to the generally irregular face of tow eye 35 by the application of pressure. After sacrificial adapter 33 has been conformed to tow eye 35 a spacer 34 is selected of the appropriate thickness to set cantilever arm assembly 22' to the appropriate pitch with respect to the vehicle. Spacer 34 is bent at both ends to secure it around bearing plate 27' and within inboard cantilever arm 63'. Inboard end of outboard cantilever arm 26' is swaged to a slightly larger diameter to permit telescopic engagement with inboard cantilever arm 63'. The embodiment shown is constructed of tubular steel. Other embodiments could be constructed of any suitably strong and durable material such titanium.

FIG. 11 also shows a cargo carrier of the present invention which has a cantilever arm assembly secured with a lockable securing means. In this embodiment, inboard cantilever arm 63 is fixedly attached to outboard cantilever arm 26 by means of pin and locking end assembly 64.

In operation, lightweight cargo carrier 10 may be carried behind a car or truck without need for a hitch by engaging tow eyes at the vehicle rear. As the vehicle moves, airflow is minimally disrupted by the presence of cargo carrier 10 resulting in a minimal reduction in fuel efficiency while carrying cargo. Vehicle loads are reduced by the efficiency of not needing a hitch to carry a load, resulting in further operational efficiencies accruing to vehicles employing a cargo carrier 10, efficiencies realized when traveling both with, and without, a cargo. One embodiment of the present invention can carry bicycles upon a rack assembly 57 at a sufficient distance rearward to permit easy opening of a rear vehicle hatch, the multiple arms being so disposed as to greatly reduce angular moment normally imposed on the carrier elements by such rearward offset of a hitch-based carrier. The operation of attaching a cargo carrier 10 of the present invention is relatively inexpensive and easy since there is no need to purchase a hitch. Finally, the use of a cargo carrier 10 makes possible cargo carrying operations by smaller vehicles for which in the past there were limited cargo options.

While exemplary systems and methods embodying the present invention are shown by way of example, it should be understood that the invention is not limited to these embodiments. Modifications can be made by those highly skilled in the art, particularly in light of the foregoing teachings. For example, each of the elements of the aforementioned embodiments may be utilized alone or in combination with elements of other embodiments.

I claim:

1. A cargo carrier adapted to be interconnected to a plurality of tow eye members at the rear of a vehicle, said cargo carrier comprising:
  (a) a plurality of cantilever arms;
  (b) a plurality of primary attachment means each of which is configured to engage one of said tow eye members and one of said cantilever arms, each of said plurality of primary attachment means configured to engage a respective aperture in one of said tow eye members; and
  (c) a cargo support means supported by said cantilever arms;
  wherein said cargo carrier is configured to be operatively coupled to said vehicle only by means of said tow eye members and without the use of a hitch assembly, and wherein said cargo carrier is configured to engage said tow eye members or said vehicle at one or more bearing points forward of said primary attachment means such that said one or more bearing points are disposed closer to a front end of said vehicle than said primary attachment means; and wherein said cargo carrier further comprises adjustment means configured to allow modification of the angle of pitch of said cantilever arms with respect to said vehicle, said adjustment means configured to engage said tow eye members at said one or more bearing points forward of said primary attachment means.

2. The cargo carrier according to claim 1, wherein the cargo support means is an enclosure defined by a top wall, a bottom wall, and an encircling side wall extending between said top and bottom walls, wherein the enclosure has a hollow interior.

3. A vehicular cargo carrier system comprising:
  a vehicle having a front end and a rear end, said vehicle having a plurality of tow eye members disposed proximate to said rear end thereof, each of said plurality of tow eye members having an aperture disposed therethrough; and
  a cargo carrier operatively coupled to said vehicle by means of said plurality of tow eye members, said cargo carrier including:
    (a) a plurality of cantilever arms;
    (b) a plurality of primary attachment means each of which engages one of said tow eye members and one of said cantilever arms, each of said plurality of primary attachment means engaging a respective said aperture in one of said tow eye members; and
    (c) a cargo support means supported by said cantilever arms;
  wherein said cargo carrier is operatively coupled to said vehicle without the use of a hitch assembly, and wherein said cargo carrier contacts said tow eye members or said vehicle at one or more bearing points forward of said primary attachment means such that said one or more bearing points are disposed closer to said front end of said vehicle than said primary attachment means; and wherein said cargo carrier further comprises adjustment means that permit modification of the angle of pitch of said cantilever arms with respect to said vehicle, said adjustment means contacting said tow eye members or said vehicle at said one or more bearing points forward of said primary attachment means.

4. The vehicular cargo carrier system according to claim 3, wherein said adjustment means is shortened or lengthened by the turning of a screw.

5. The vehicular cargo carrier system according to claim 3, wherein each of said cantilever arms is an assembly comprised of:
   (a) a plurality of members adapted to telescopically engage one another; and
   (b) a securing means whereby said members are fixedly attached to one another.

6. The vehicular cargo carrier system according to claim 5, wherein the securing means is lockable.

7. The vehicular cargo carrier system according to claim 3, wherein the cargo support means is an enclosure defined by a top wall, a bottom wall, and an encircling side wall extending between said top and bottom walls, wherein the enclosure has a hollow interior.

8. The vehicular cargo carrier system according to claim 3, wherein the cargo support means is a platform.

9. The vehicular cargo carrier system according to claim 3, wherein the cargo support means is a rack.

10. The vehicular cargo carrier system according to claim 3, wherein said adjustment means further includes an adjustment screw or a spacer that contacts said tow eye members or said vehicle at said one or more bearing points forward of the primary attachment means.

11. The vehicular cargo carrier system according to claim 5, wherein said securing means comprises one of the following: (i) a pin and clip assembly; and (ii) a pin and locking end assembly.

12. The vehicular cargo carrier system according to claim 3, wherein said cargo support means comprises one of the following: (i) an enclosure; (ii) a platform; and (iii) a rack.

13. The vehicular cargo carrier system according to claim 3, wherein each of said plurality of cantilever arms comprises:
   a first arm member connected to a respective one of said tow eye members by means of a respective one of said plurality of primary attachment means; and
   a second arm member detachably coupled to said first arm member by means of (i) a pin and clip assembly or (ii) a pin and locking end assembly.

14. A cargo carrier adapted to be interconnected to a plurality of tow eye members at the rear of a vehicle, said cargo carrier comprising:
   (a) a plurality of cantilever arms;
   (b) a plurality of primary attachment means each of which is configured to engage one of said tow eye members and one of said cantilever arms, each of said plurality of primary attachment means configured to engage a respective aperture in one of said tow eye members;
   (c) a cargo support means supported by said cantilever arms, said cargo support means being disposed on a first side of said primary attachment means; and
   (d) adjustment means configured to allow modification of the angle of pitch of said cantilever arms with respect to said vehicle, said adjustment means configured to contact said tow eye members or said vehicle at one or more bearing points forward of said primary attachment means such that said one or more bearing points of said adjustment means are disposed on a second side of said primary attachment means that is opposite to said first side, and said one or more bearing points are disposed closer to a front end of said vehicle than said primary attachment means;
   wherein said cargo carrier is configured to be operatively coupled to said vehicle without the use of a hitch assembly.

15. The cargo carrier according to claim 14, wherein each said adjustment means further comprises:
   an adjustment nut disposed in the forward end portion of one of said cantilever arms; and
   an adjustment screw matingly engaged with said adjustment nut.

* * * * *